Patented Jan. 13, 1931

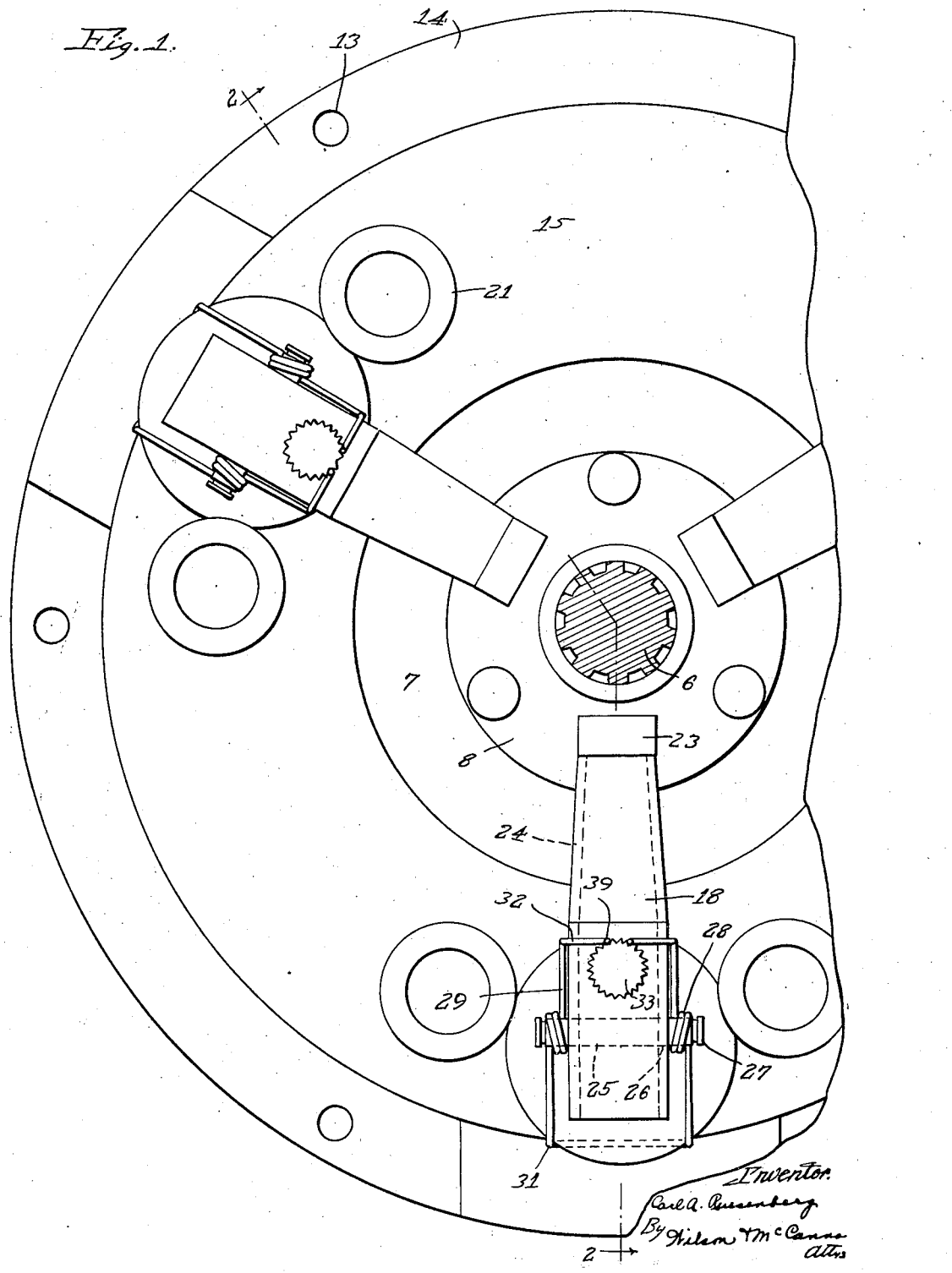

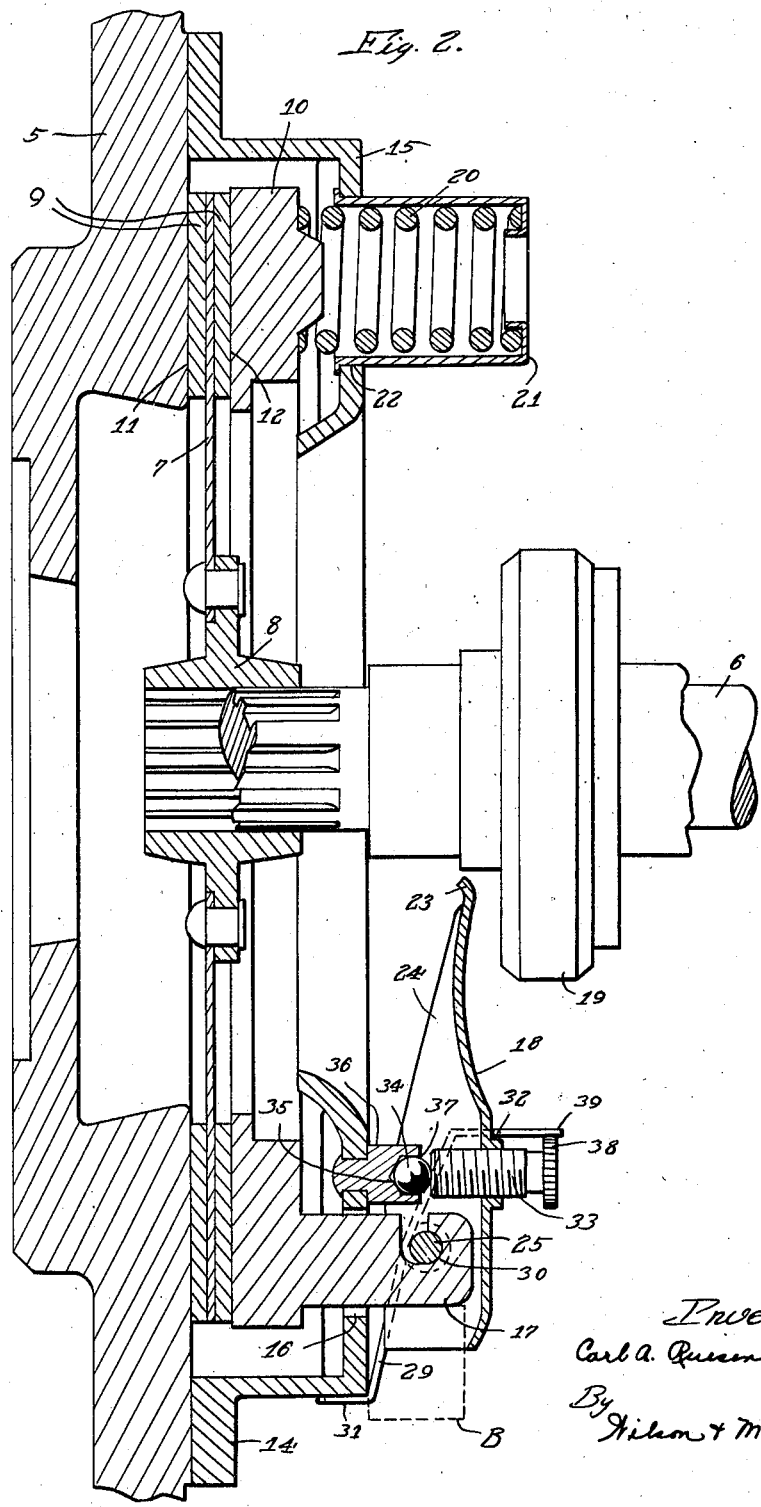

1,788,806

UNITED STATES PATENT OFFICE

CARL A. RUESENBERG, OF ROCKFORD, ILLINOIS, ASSIGNOR TO ROCKFORD DRILLING MACHINE CO., OF ROCKFORD, ILLINOIS, A CORPORATION OF ILLINOIS

FRICTION CLUTCH

Application filed September 9, 1929. Serial No. 391,171.

This invention relates to friction clutches especially adapted for use on motor vehicles.

Clutches for motor vehicles as heretofore designed commonly employed release levers mounted slightly askew, that is, at an angle to the radius of the flywheel, the object being to make it possible to use longer release levers for better leverage and proportionately easier operation of the clutch. That sort of design however, is not satisfactory for high speed engines such as the motor industry is coming to more and more at the present time, because at high speeds the centrifugal force has a tendency to twist the release levers off their mountings. This has been shown by actual test; the lugs or flanges on the release levers bearing on opposite sides of the square studs or posts on the pressure plate were found to bend outwardly and to shear off the ends of the pivot pins under the terrific centrifugal force that has to be taken into consideration at high speeds. In some instances the studs themselves would twist off under the peculiar combination of stresses to which they were subjected. It is therefore one of the principal objects of my invention to provide a friction clutch having the release levers disposed exactly radially with reference to the flywheel so that the studs, pivot pins, and the release levers are not subjected to a combination of stresses tending to twist the parts but are subjected to simply radial thrust which can be provided for without any serious difficulty, so that there will be no danger of any of the parts giving way under dynamic test. By the good design of the rest of the clutch with a view to easy operation a clutch having shorter release levers radially disposed is found to operate just as easily as the other clutches provided in the past.

Another point in regard to clutches provided in the past, that has been pretty well recognized as a serious objection to their design, is the fact that practically all of them require too much time for assembling on the flywheel. The clutch manufacturer, who provides the clutch disc, back plate and pressure plate together with the release levers and springs therefor, left the matter of the assembling thereof piece by piece on the flywheel to the car manufacturer. It is therefore another principal object of my invention to provide a clutch the construction of which permits the preassembling of the back plate, pressure plate, and release levers, so that the assembling on the flywheel can be completed by simply bolting the back plate thereto. The release levers are made with the pivot pins permanently secured thereto and arranged to be slipped onto the studs on the pressure plate by the entering of the pins in bayonet slots provided on the inside of the studs, such a connection being practical in this case because of the fact that the release levers are subjected simply to radial thrust and there is consequently no tendency for the pins to become dislodged from the slots under centrifugal force. The springs provided for the purpose of keeping the adjusting screws on the release levers in contact with the back plate may by virtue of this construction be assembled on the pivot pins to make a unitary assembly of each lever with its pivot pin and spring. The clutch assembly is arranged to be adjusted at the clutch manufacturer's factory so that there will be little or no necessity for adjustment later by the car manufacturer at the time the clutch is assembled on the flywheel. In that way, a further saving in time is effected.

The invention is fully described in the following specification in which reference is made to the accompanying drawings wherein—

Figure 1 is a rear view of a clutch assembly made in accordance with my invention; and Fig. 2 is a section through a flywheel with the clutch assembled thereon, the section through the clutch itself being taken on the line 2—2 of Fig. 1.

The same reference numerals are applied to corresponding parts in the two views.

Referring to the drawing, the reference numeral 5 designates a flywheel arranged to be mounted in the usual way on the rear end of an engine crank-shaft, it being understood that the flywheel constitutes the driving element of the clutch. A shaft 6 constituting the driven element extends rearwardly from the clutch into the gear box of the transmission, there being ordinarily a housing about the flywheel and clutch assembly at the front end of the gear box, as is well known. The housing usually has an inspection plate which, when removed, affords access to the clutch for purposes of adjustment. The clutch disc appearing at 7 is carried on the usual hub 8 splined as shown on the forward end of the shaft 6 and has the usual pads or facings 9 on the opposite sides of the marginal portion thereof disposed for engagement with the flywheel 5 and pressure plate 10. The back face 11 of the flywheel is ground smooth and square with the axis and the same is true of the front face 12 of the pressure plate 10. The clutch thus far described, is of ordinary construction and no invention is, of course, claimed in these details except only insofar as they form a part of the general combination hereinafter fully described. In passing, attention may be called to the fact that there is no rim provided on the flywheel, the back thereof being milled off flat entirely across the same. It is common practice to provide tapped holes in the back of the flywheel for the bolting of the back plate thereto, these holes being spaced in accordance with the specifications of the clutch manufacturer whose clutch is to be used. Thus the bolt holes in the flywheel will be arranged to register with holes 13 in the rim 14 of a back plate 15.

According to my invention the back plate 15, which is suitably cast, is provided with three holes 16 for the projection therethrough of square studs or posts 17 preferably cast integral with the pressure plate 10 and of sufficient section to assume the radial thrust imposed thereon by the release levers 18 at the highest speeds at which the engine may be run, without danger of the studs fracturing. The levers 18 are short enough to permit of their being disposed exactly radially, reaching from the posts 17 radially inwardly to the throw-out collar 19. The pressure plate 10 is normally urged toward the flywheel under the action of six coiled compression springs 20 disposed in sheet metal cups 21 mounted in holes 22 in the back plate 15, it being common practice to provide two of these springs on opposite sides of each of the release levers as indicated in Fig. 1, in which figure the cups 21 appear in rear elevation. Each of the release levers 18 is stamped from sheet metal to provide a rounded inner end 23 arranged to be engaged by the throw-out collar and longitudinally extending, substantially parallel, side flanges 24 fitting on opposite sides of the stud 17 associated therewith. A cross-pin 25 is entered through registering holes 26 provided in the flanges 24 and has the opposite ends thereof headed, as shown at 27, reserving sufficient space between the heads and the sides of the lever for a few coils 28 of a spring 29. The object is to make a unitary assembly of each lever 18 with its pivot pin 25 and spring 29. The function of the spring will be brought out presently. Each stud 17 has a bayonet slot 30 either cast or machined in the inner face thereof for the reception of the pivot pin 25 of the release lever 18 associated with said stud. The release lever is, therefore, arranged to be attached to the stud by entry of the pivot pin thereof in the bayonet slot from the inside of the stud. The pin sets in the undercut portion of the slot, as clearly appears in Fig. 2, the spring 29 associated with the lever serving to hold it in that position by reason of the fact that the crotch or bight portion 31 of said spring engages the back plate 15, and the free ends 32 of said spring engage the back of the lever on the other side of the pin. In other words the opposite extremities of the spring 29 tend to move toward one another, the bight portion 31 in a clockwise direction and the end portions 32 in a counter clockwise direction with reference to the pin 25 as the parts are viewed in Fig. 2, which accounts for the setting of the pin 25 in the undercut portion of the bayonet slot 30. There is nothing tending to dislodge the pin 25 from the slot 30 in the turning of the flywheel owing to the fact that the thrust imposed on the pin 25 is in a radial direction by reason of the radial disposition of the release lever. Each release lever has the usual adjusting screw 33 threading through the back wall thereof and the inner end of each of these screws engages a ball 34 seated in a recess 35 provided in a stud 36 riveted to the back plate 15. The stud is peened at 37 so as to retain the ball 34 while permitting the ball to turn freely. The use of these balls as bearings for the adjusting screws minimizes friction and makes the clutch that much easier to operate. The head 38 of each screw is serrated as shown and the ends 32 of the spring 29 are bent up for engagement with the side of the head as indicated at 39 so as to hold the screw in adjusted position. The spring 29 of each lever serves to keep the lever from swinging in a clockwise direction about its pivot pin in the turning of the flywheel; the screw 33 is therefore always kept in contact with the ball 34.

In the operation of the clutch it is no doubt evident that when the throw-out sleeve 19 is in the retracted position shown in Fig. 2, the springs 20 serve to force the pressure plate 10 toward the flywheel to transmit drive from the flywheel to the clutch disc 7. When the throw-out sleeve 19 is moved forward it engages the inner ends 23 of the release levers 18 and swings the levers in a counter-clockwise direction about the balls 34 as fulcrums, so that the pressure plate 10 is retracted with reference to the flywheel against the action of the springs 20, and the flywheel is thereafter free to turn relative to the clutch disc 7. When the pads 9 become worn to such an extent that there is not enough clearance left between the inner ends of the release levers and the throw-out sleeve with the latter in retracted position, the screws 33 must be adjusted to bring the parts back to the relationship shown in Fig. 2, the screws being backed up one or more turns for that purpose. The ends 39 of the springs 29 yieldingly engaging the serrated heads of the screws 33 permit the same to be turned by hand but will not permit the same to turn by reason of vibration or such other disturbances as may be incidental to the operation of the clutch. Ordinarily a special locking feature had to be provided for this purpose; in the present case I have made a simpler construction by utilizing the springs 29 for two purposes.

In practice, the clutch manufacturer makes up the complete clutch assembly of the pressure plate 10, back plate 15 and release levers 18 together with the springs 20, the springs 20 being compressed enough to allow the release levers to be slipped over the studs to enter the pins 25 in the slots 30, and small blocks, such as that indicated in dotted lines at B in Fig. 2, being inserted between the outer ends of the release levers and the back plate to keep the parts assembled until they are being mounted on the flywheel. The blocks B are just enough under-size so that when the bolts for fastening the back plate onto the flywheel are tightened they will drop out. The screws 33 are adjusted at the factory of the clutch manufacturer at the time the parts are assembled together, it being obvious that if the assembly is completed on a part corresponding to the flywheel 5 and the screws are properly adjusted to bring the inner ends of the release levers to proper spaced relation with reference to the back face of the flywheel, the assembly can be removed with every assurance that when it is later actually mounted on a flywheel all of the parts will be brought back to the same relationship and there will be no need for any further adjustment. The great saving in time effected with my invention is thought to be self-evident from the foregoing description.

The appended claims have been drawn with a view to covering all legitimate modifications and adaptations of my invention, such as will, no doubt, occur to others skilled in this art as a result of this disclosure.

I claim:

1. In a friction clutch, the combination with a driving element, such as a fly-wheel, a driven element, such as a clutch disk, a pressure plate, a back plate, and springs acting between the back plate and pressure plate normally urging the same toward the flywheel, of a plurality of studs on the pressure plate projecting through holes in the back plate, said studs having transverse slots on the inner sides of their projecting ends, release levers having pivot pins permanently assembled thereon disposed crosswise thereof entered sidewise in said slots, and means for fulcruming said levers on the back plate.

2. In a friction clutch, the combination with a driving element, such as a fly-wheel, a driven element, such as a clutch disk, a pressure plate, a back plate, and springs acting between the back plate and pressure plate normally urging the same toward the flywheel, of a plurality of studs on the pressure plate projecting through holes in the back plate, said studs having transverse slots on the inner sides of their projecting ends, release levers disposed substantially radially and having pivot pins permanently assembled thereon disposed crosswise thereof entered sidewise in said slots, adjusting screws on said levers for the fulcruming thereof, and abutments for said screws on the back plate.

3. A clutch as set forth in claim 2, including a spring for each lever having an intermediate portion coiled about the pin and having one end thereof engaging the back plate, and the other end engaging the lever tending normally to hold the adjusting screw in contact with its abutment, the said spring being permanently assembled on the pin and constituting a unitary assembly with the pin and lever, whereby the same is arranged to be brought into engagement with the back plate when the pin is entered in the slot in the assembling of the lever on the stud.

4. A clutch as set forth in claim 2, including a spring for each lever having an intermediate portion coiled about the pin and having one end thereof engaging the back plate, and the other end engaging the lever tending normally to hold the adjusting screw in contact with its abutment, the said spring having the last mentioned end thereof bent so as to extend alongside of the adjusting screw to hold the same yieldingly against turning by frictional engagement therewith.

5. In a friction clutch, the combination with a driving element, such as a fly-wheel, a driven element, such as a clutch disk, a pressure plate, a back plate, and springs acting between the back plate and pressure plate normally urging the same toward the flywheel, of a plurality of studs on the pressure plate projecting rearwardly through holes in the back plate, said studs having bayonet slots on the inner sides of their projecting ends, the inner ends of said slots being undercut rearwardly, release levers disposed substantially radially with respect to the flywheel and having cross pins permanently assembled thereon arranged to be entered sidewise in said slots and to seat in the undercut inner ends thereof, whereby to serve as pivot pins for said levers, and means on said levers for the fulcruming thereof on the back plate.

6. A clutch as set forth in claim 5, including a spring for each lever having an intermediate portion coiled about the pin and having one end thereof engaging the back plate, and the other end engaging the lever tending to hold the lever in fulcruming contact with the back plate and also serving normally to urge the pin toward seating in the undercut inner end portion of the bayonet slot in said stud.

7. A friction clutch assembly arranged to be secured as a unitary assembly onto a flywheel, comprising, in combination, a back plate, a pressure plate, springs acting between the back plate and pressure plate normally tending to move the latter away from the former, said pressure plate having studs projecting rearwardly therefrom through holes in the back plate, abutments projecting rearwardly from the back plate alongside the aforesaid studs and disposed radially inwardly with respect thereto, release levers adapted to be pivotally assembled on said studs and disposed substantially radially with reference to the clutch assembly and having adjusting screws arranged to engage the aforesaid abutments, said studs having slots on the inner sides thereof opening toward the abutments, and cross pins on said release levers arranged to be entered sidewise into said slots for pivotally mounting the levers on the studs.

8. A friction clutch assembly arranged to be secured as a unitary assembly onto a flywheel, comprising, in combination, a back plate, a pressure plate, springs acting between the back plate and pressure plate normally tending to move the latter away from the former, said pressure plate having studs projecting rearwardly therefrom through holes in the back plate, abutments projecting rearwardly from the back plate alongside the aforesaid studs and disposed radially inwardly with respect thereto, release levers adapted to be pivotally assembled on said studs and disposed substantially radially with reference to the clutch assembly and having adjusting screws arranged to engage the aforesaid abutments, said studs having slots on the inner sides thereof opening toward the abutments, and cross pins on said release levers arranged to be entered sidewise into said slots for pivotally mounting the levers on the studs, the pressure plate being arranged to be moved toward the back plate against the action of the springs sufficiently to permit entry of the pins in the slots past the abutments, the latter in the normal position of the pressure plate serving positively to prevent exit of the pins from said slots.

9. An assembly as set forth in claim 7, wherein each of the release levers projects radially outwardly beyond the stud associated therewith, whereby to receive a removable shim block between the back plate and the release lever for holding the parts approximately in their ultimate positions preparatory to the fastening of the assembly onto the fly wheel, whereupon the said blocks are arranged to be removed or to drop out of position.

10. A friction clutch assembly arranged to be secured as a unitary assembly onto a flywheel, comprising, in combination, a back plate, a pressure plate, springs acting between the back plate and pressure plate normally tending to move the latter away from the former, said pressure plate having studs projecting rearwardly therefrom through holes in the back plate, said studs having transverse slots on the inner side of their projecting ends, release levers adapted to be mounted on said studs radially disposed with reference to the clutch assembly and having cross pins thereon arranged to be entered sidewise into said slots for pivotally mounting the release levers on the studs, adjusting screws on said levers for the fulcruming thereof, abutments on the back plate for said screws, and means acting between the back plate and the release levers for releasably holding the parts approximately in their ultimate assembled positions against the action of the aforesaid springs preparatory to the fastening of the back plate to the flywheel.

11. An assembly as set forth in claim 10, wherein the last mentioned means comprises removable shim blocks arranged to be inserted between the back plate and the outer ends of said release levers, the latter having their outer ends projecting beyond the studs sufficiently for that purpose.

12. In a friction clutch comprising the usual back plate and the usual pressure plate with springs acting between the back plate and pressure plate, a stud on the pressure plate projecting through a hole in the back plate, a release lever stamped from sheet metal to generally channel shape arranged to be pivotally assembled on the projecting end of said stud, the said lever having a cross pin extending through the side flanges thereof and permanently assembled on the lever as a unitary assembly, said stud having a transverse slot in the side thereof for reception of said pin, and means for the fulcruming of said lever on the back plate.

13. A structure as set forth in claim 12, including a spring of the door type, generally U-shaped, each of the side portions thereof having a coil assembled on the projecting end of the cross pin alongside the lever and having one end of the side portion bearing on the back of the release lever and the other end bearing against the back plate, the said cross pin having the opposite ends thereof headed to make a permanent unitary assembly of the spring pin, and lever for assembly as a unit on the stud.

14. A structure as set forth in claim 12, including a spring of the door type, generally U-shaped, each of the side portions thereof having a coil assembled on the projecting end of the cross pin alongside the lever and having one end of the side portion bearing on the back of the release lever and the other end bearing against the back plate, the said cross pin having the opposite ends thereof headed to make a permanent unitary assembly of the spring, pin, and lever for assembly as a unit on the stud, the ends bearing on the back of the lever being bent so as to extend outwardly relative to the lever, and there being an adjusting screw on said lever for the fulcruming thereof, the said adjusting screw having a serrated head portion for the turning thereof by hand engaged by the bent ends of said spring for the purpose stated.

In witness of the foregoing I affix my signature.

CARL A. RUESENBERG.